US010901562B2

(12) United States Patent
Leigh et al.

(10) Patent No.: US 10,901,562 B2
(45) Date of Patent: Jan. 26, 2021

(54) MOVEMENT ENHANCED DETECTION

(71) Applicant: Tactual Labs Co., New York, NY (US)

(72) Inventors: Darren Leigh, Round Hill, VA (US);
Adam Landa, Forest City, FL (US);
Braon Moseley, Round Rock, TX (US)

(73) Assignee: Tactual Labs Co., New York, NY (US)

( * ) Notice: Subject to any disclaimer, the term of this patent is extended or adjusted under 35 U.S.C. 154(b) by 0 days.

(21) Appl. No.: 16/383,886

(22) Filed: Apr. 15, 2019

(65) Prior Publication Data

US 2019/0317622 A1    Oct. 17, 2019

Related U.S. Application Data

(60) Provisional application No. 62/657,205, filed on Apr. 13, 2018.

(51) Int. Cl.
*G06F 3/044* (2006.01)
*G06F 3/041* (2006.01)

(52) U.S. Cl.
CPC ............ *G06F 3/044* (2013.01); *G06F 3/0414* (2013.01)

(58) Field of Classification Search
None
See application file for complete search history.

(56) References Cited

U.S. PATENT DOCUMENTS

| 8,456,177 | B2* | 6/2013 | Griffin | B60N 2/002 180/274 |
| 2008/0142713 | A1* | 6/2008 | Breed | B60R 21/01516 250/330 |
| 2017/0150929 | A1* | 6/2017 | Sankai | A61B 5/742 |
| 2018/0345894 | A1* | 12/2018 | Althaus | B60R 21/01532 |

* cited by examiner

*Primary Examiner* — Nicholas J Lee
(74) *Attorney, Agent, or Firm* — Adam B. Landa

(57) ABSTRACT

A sensor is located within a vehicle that is able to determine pressure and location of an occupant or object. The sensor is able to take measurements during static conditions and situations where an object or occupant is moving due to the movement of, for example, a vehicle. The measurements taken during movement and during the static conditions and are used in order to enhance and refine the results of measurements that would be obtained if the measurements were taken alone.

20 Claims, 3 Drawing Sheets

MOVEMENT ENHANCED DETECTION

MOVEMENT ENHANCED DETECTION

This application claims the benefit of U.S. Provisional Application Ser. No. 62/657,205 filed Apr. 13, 2018, the contents of which are hereby incorporated by reference. This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The disclosed systems relate in general to the field of sensors, and in particular to enhancement of measurements taken by the sensors.

BRIEF DESCRIPTION OF THE DRAWINGS

The foregoing and other objects, features, and advantages of the disclosure will be apparent from the following more particular description of embodiments as illustrated in the accompanying drawings in which reference characters refer to the same parts throughout the various views. The drawings are not necessarily to scale, emphasis instead being placed upon illustrating principles of the disclosed embodiments.

DETAILED DESCRIPTION

Figure 1:
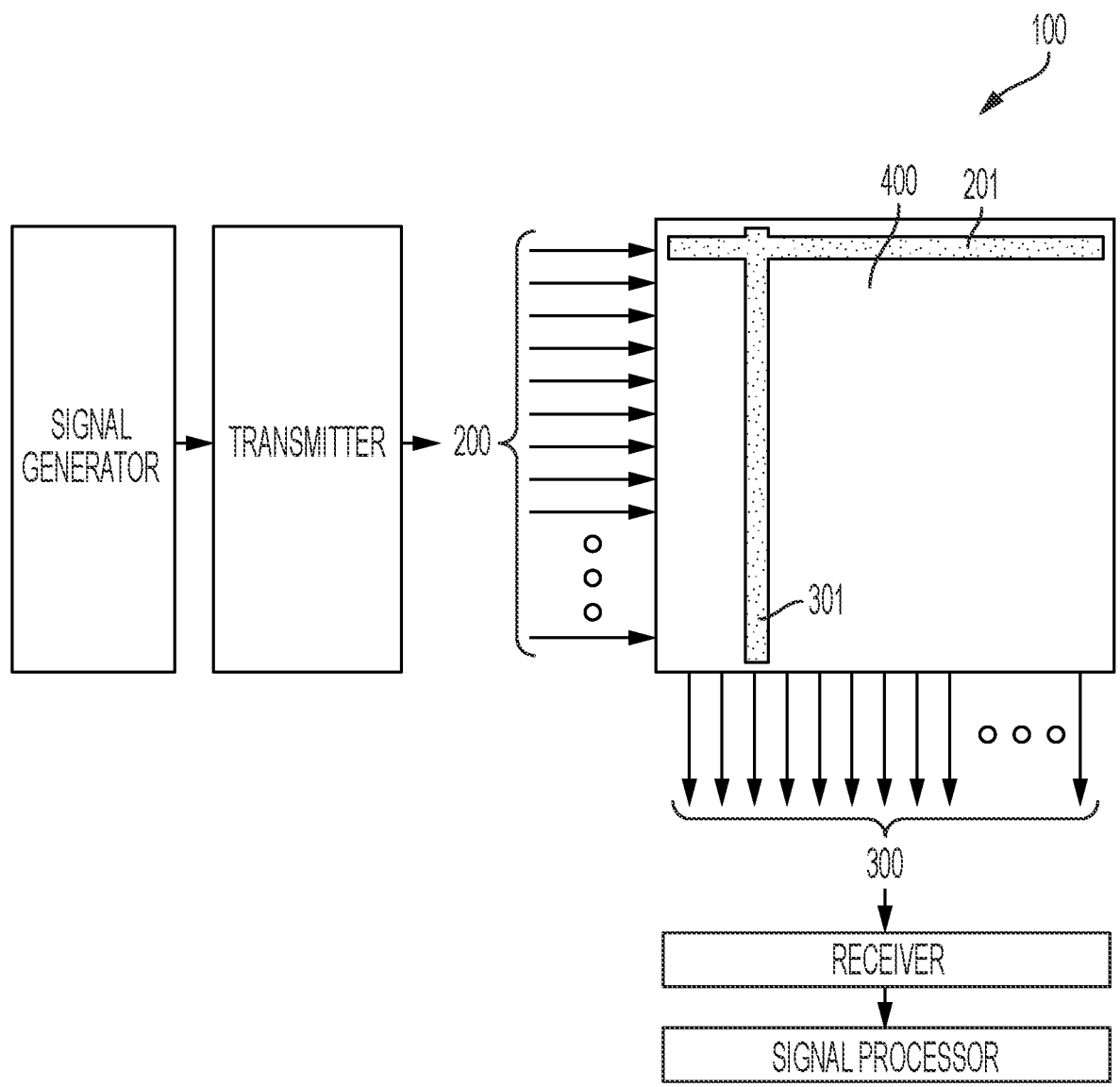
FIG. 1 is a high level block diagram illustrating an embodiment of a low-latency sensor.

In various embodiments, the present disclosure is directed to systems sensitive to hover, contact and pressure and their applications in real-world, artificial reality, virtual reality and augmented reality settings. It will be understood by one of ordinary skill in the art that the disclosures herein apply generally to all types of systems to detect hover, contact and pressure.

Throughout this disclosure, the terms "event", "touch", "touches", "touch event", "contact", "contacts", "hover", or "hovers" or other descriptors may be used to describe events or periods of time in which a key, switch, user's finger, a stylus, an object, or a body part is detected by a sensor. In some sensors, detections occur only when the user is in physical contact with a sensor, or a device in which it is embodied. In some embodiments, and as generally denoted by the word "contact", these detections occur as a result of physical contact with a sensor, or a device in which it is embodied. In other embodiments, and as sometimes generally referred to by the term "hover", the sensor may be tuned to allow for the detection of "touches" or "events" that are hovering at a distance above the touch surface or otherwise separated from the sensor device and causes a recognizable change, despite the fact that the conductive or capacitive object, e.g., a finger, is not in actual physical contact with the surface. Therefore, the use of language within this description that implies reliance upon sensed physical contact should not be taken to mean that the techniques described apply only to those embodiments; indeed, nearly all, if not all, of what is described herein would apply equally to "contact" and "hover", each of which is a "touch". Generally, as used herein, the word "hover" refers to non-contact events or touch, and as used herein the term "hover" is one type of "touch" in the sense that "touch" is intended herein. Thus, as used herein, the phrase "touch event" and the word "touch" when used as a noun include a near touch and a near touch event, or any other gesture that can be identified using a sensor. "Pressure" refers to the force per unit area exerted by a user contact (e.g., presses by their fingers or hand) against the surface of an object. The amount of "pressure" is similarly a measure of "contact", i.e., "touch". "Touch" refers to the states of "hover", "contact", "pressure", or "grip", whereas a lack of "touch" is generally identified by signals being below a threshold for accurate measurement by the sensor. In accordance with an embodiment, events may be detected, processed, and supplied to downstream computational processes with very low latency, e.g., on the order of ten milliseconds or less, or on the order of less than one millisecond.

As used herein, and especially within the claims, ordinal terms such as first and second are not intended, in and of themselves, to imply sequence, time or uniqueness, but rather, are used to distinguish one claimed construct from another. In some uses where the context dictates, these terms may imply that the first and second are unique. For example, where an event occurs at a first time, and another event occurs at a second time, there is no intended implication that the first time occurs before the second time, after the second time or simultaneously with the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristic. Thus, for example, a first and a second frequency, absent further limitation, could be the same frequency, e.g., the first frequency being 10 Mhz and the second frequency being 10 Mhz; or could be different frequencies, e.g., the first frequency being 10 Mhz and the second frequency being 11 Mhz. Context may dictate otherwise, for example, where a first and a second frequency are further limited to being frequency-orthogonal to each other, in which case, they could not be the same frequency.

The presently disclosed systems and methods provide for designing, manufacturing and using sensors, and particularly sensors that employ a multiplexing scheme based on orthogonal signaling such as but not limited to frequency-division multiplexing (FDM), code-division multiplexing (CDM), or a hybrid modulation technique that combines both FDM and CDM methods. References to frequency herein could also refer to other orthogonal signal bases. As such, this application incorporates by reference Applicants' prior U.S. Pat. No. 9,019,224, entitled "Low-Latency Touch Sensitive Device" and U.S. Pat. No. 9,158,411 entitled "Fast Multi-Touch Post Processing." These applications contemplate FDM, CDM, or FDM/CDM hybrid touch sensors which may be used in connection with the presently disclosed sensors. In such sensors, interactions are sensed when a signal from a row is coupled (increased) or decoupled (decreased) to a column and the result received on that column. By sequentially exciting the rows and measuring the coupling of the excitation signal at the columns, a heatmap reflecting capacitance changes, and thus proximity, can be created.

This application also employs principles used in fast multi-touch sensors and other interfaces disclosed in the following: U.S. Pat. Nos. 9,933,880; 9,019,224; 9,811,214;

9,804,721; 9,710,113; and 9,158,411. Familiarity with the disclosure, concepts and nomenclature within these patents is presumed. The entire disclosures of those patents and the applications incorporated therein by reference are incorporated herein by reference. This application also employs principles used in fast multi-touch sensors and other interfaces disclosed in the following: U.S. patent application Ser. Nos. 15/162,240; 15/690,234; 15/195,675; 15/200,642; 15/821,677; 15/904,953; 15/905,465; 15/943,221; 62/540,458, 62/575,005, 62/621,117, 62/619,656 and PCT publication PCT/US2017/050547, familiarity with the disclosures, concepts and nomenclature therein is presumed. The entire disclosure of those applications and the applications incorporated therein by reference are incorporated herein by reference.

FIG. 1 illustrates certain principles of a sensor 100 in accordance with an embodiment. At 200, a different signal is transmitted into each of the row conductors 201 of the surface 400. The signals are designed to be "orthogonal", i.e., separable and distinguishable from each other. At 300, a receiver is attached to each column conductor 301. The row conductors 201 and the column conductors 301 are conductors/antennas that are able to transmit and/or receive signals. The receiver is designed to receive any of the transmitted signals, or an arbitrary combination of them, with or without other signals and/or noise, and to individually determine a measure, e.g., a quantity for each of the orthogonal transmitted signals present on that column conductor 301. The surface 400 of the sensor comprises a series of row conductors 201 and column conductors 301 (not all shown), along which the orthogonal signals can propagate. In an embodiment, the row conductors 201 and column conductors 301 are arranged such that an event (i.e. any movement or touch that causes displacement of a row conductor 201 with respect to a row conductor 301, or interaction between the row conductor 201 and column conductor 301) will cause a change in coupling between at least one of the rows and at least one of the columns. In an embodiment, an event will cause a change in the amount (e.g., magnitude) of a signal transmitted on a row conductor that is detected in the column conductor. In an embodiment, an event will cause a change in the phase of a signal transmitted on a row conductor that is detected on a column conductor. Because the sensor ultimately detects an event due to a change in the coupling, it is not of specific importance, except for reasons that may otherwise be apparent to a particular embodiment, the type of change that is caused. As discussed above, the event does not require a physical touching, but rather an event that affects the coupled signal. In an embodiment the event does not require a physical touching, but rather an event that affects the coupled signal in a repeatable or predictable manner.

With continued reference to FIG. 1, in an embodiment, generally, the result of an event in proximity of both a row conductor 201 and column conductor 301 causes a change in the signal that is transmitted on a row conductor as it is detected on a column conductor. In an embodiment, the change in coupling may be detected by comparing successive measurements on the column conductor. In an embodiment, the change in coupling may be detected by comparing the characteristics of the signal transmitted on the row conductor to a measurement made on the column conductor. In an embodiment, a change in coupling may be measured by both comparing successive measurements on the column conductor and by comparing known characteristics of the signal transmitted on the row conductor to a measurement made on the column conductor.

More generally, events cause, and thus correspond to, measurements of the signals on the column conductors 301. Because the signals on the row conductors 201 are orthogonal, multiple row signals can be coupled to a column conductor 301 and distinguished by the receiver. Likewise, the signals on each row conductor 201 can be coupled to multiple column conductors 301. For each column conductor 301 coupled to a given row conductor 201 (and regardless of how touch affects the coupling between the row and column), the signals measured on the column conductor 301 contain information that will indicate which row conductors 201 are being interacted with simultaneously with that column conductor 301. The magnitude or phase shift of each signal received is generally related to the amount of coupling between the column conductor 301 and the row conductor 201 carrying the corresponding signal, and thus, may indicate a distance of the touching object to the surface, an area of the surface covered by the interaction and/or the pressure of the interaction.

In various implementations of a device, physical contact with the row conductors 201 and/or column conductors 301 is unlikely or impossible as there may be a protective barrier between the row conductors 201 and/or column conductors 301 and the object of interaction. Moreover, generally, the row conductors 201 and column conductors 301 themselves are not in physical contact with each other, but rather, placed in a proximity that allows signal to be coupled therebetween, and that coupling changes with interaction. Generally, the row-column coupling results not from actual contact between them, nor by actual contact from the object, but rather, by the effect of bringing the object into proximity, with the proximity resulting in a change of coupling.

In an embodiment, the orientation of the row conductors and column conductors may vary as a consequence of a physical process, and the change in the orientation (e.g., movement) of the row conductors and/or column conductors with respect to one-another may cause a change in coupling. In an embodiment, the orientation of a row conductor and a column conductor may vary as a consequence of a physical process, and the range of orientation between the row conductor and column conductor includes ohmic contact, thus in some orientations within a range a row conductor and column conductor may be in physical contact, while in other orientations within the range, the row conductor and column conductor are not in physical contact and may have their coupling varied. In an embodiment, when a row conductor and column conductor are not in physical contact their coupling may be varied as a consequence of moving closer together or further apart. In an embodiment, when a row conductor and column conductor are not in physical contact their coupling may be varied as a consequence of grounding. In an embodiment, when a row conductor and column conductor are not in physical contact their coupling may be varied as a consequence of materials translated within the coupled field. In an embodiment, when a row conductor and column conductor are not in physical contact their coupling may be varied as a consequence of a changing shape of the row conductor or column conductor, or an antenna associated with the row conductor or column conductor.

The nature of the row conductors 201 and column conductors 301 is arbitrary and the particular orientation is irrelevant. Indeed, the terms row conductor 201 and column conductor 301 are not intended to refer to a square grid, but rather to a set of conductors upon which signal is transmitted (rows) and a set of conductors onto which signal may be coupled (columns). The notion that signals are transmitted on row conductors 201 and received on column conductors 301 itself is arbitrary, and signals could as easily be transmitted on conductors arbitrarily designated column conductors and received on conductors arbitrarily named row conductors, or both could arbitrarily be named something else. Further, it is not necessary that row conductors and column conductors be in a grid. Other shapes are possible as long as an event will affect a row-column coupling. For example, the "rows" could be in concentric circles and the "columns" could be spokes radiating out from the center. And neither the "rows" nor the "columns" need to follow any geometric or spatial pattern. Moreover, an antenna/conductor may be round or rectangular, or have substantially any shape, or a shape that changes. An antenna/conductor used as a row conductor may be oriented in proximity to one or more antennas/conductors that act as column conductors. In other words, in an embodiment, an antenna may be used for signal transmission and oriented in proximity to one or more conductors, or one or more other antennas that are used to receive signals. An event will change the coupling between the antenna used for signal transmission and the signal used to receive signals.

It is not necessary for there to be only two types signal propagation channels: instead of rows and columns, in an embodiment, channels "A", "B" and "C" may be provided, where signals transmitted on "A" could be received on "B" and "C", or, in an embodiment, signals transmitted on "A" and "B" could be received on "C". It is also possible that the signal propagation channels can alternate function, sometimes supporting transmitters and sometimes supporting receivers. It is also contemplated that the signal propagation channels can simultaneously support transmitters and receivers—provided that the signals transmitted are orthogonal, and thus separable, from the signals received. Three or more types of antenna or conductors may be used rather than just "rows" and "columns." Many alternative embodiments are possible and will be apparent to a person of skill in the art after considering this disclosure.

It is likewise not necessary for there to be only one signal transmitted on each transmitting media. In an embodiment, multiple orthogonal signals are transmitted on each row. In an embodiment, multiple orthogonal signals are transmitted on each transmit antenna.

Returning briefly to FIG. 1, as noted above, in an embodiment the surface 400 comprises a series of row conductors 201 and column conductors 301, along which signals can propagate. As discussed above, the row conductors 201 and column conductors 301 are oriented so that, when they are not being interacted with the signals are coupled differently than when they are being interacted with. The change in signal coupled between them may be generally proportional or inversely proportional (although not necessarily linearly proportional) to the event such that an event is measured as a gradation, permitting distinction between more pressure (i.e., closer or firmer) and less pressure (i.e., farther or softer)—and even no pressure.

At 300, a receiver is attached to each column conductor 301. The receiver is designed to receive the signals present on the column conductors 301, including any of the orthogonal signals, or an arbitrary combination of the orthogonal signals, and any noise or other signals present. Generally, the receiver is designed to receive a frame of signals present on the column conductors 301, and to identify the column conductors providing signal. A frame of signals is received during an integration period or sampling period. In an embodiment, the receiver (or a signal processor associated with the receiver data) may determine a measure associated with the quantity of each of the orthogonal transmitted signals present on that column conductor 301 during the time the frame of signals was captured. In this manner, in addition to identifying the row conductors 201 with each column conductor 301, the receiver can provide additional (e.g., qualitative) information concerning the event. In general, events may correspond (or inversely correspond) to the received signals on the column conductors 301. For each column conductor 301, the different signals received thereon indicate which of the corresponding row conductors 201 is being interacted with simultaneously with that column conductor 301. In an embodiment, the amount of coupling between the corresponding row conductor 201 and column conductor 301 may indicate e.g., the area of the surface covered by the event, the pressure of the event, etc. In an embodiment, a change in coupling over time between the corresponding row conductor 201 and column conductor 301 indicates a change at the intersection of the two.

In an embodiment, a mixed signal integrated circuit can be employed that comprises signal generator, transmitter, receiver and signal processor. In an embodiment, the mixed signal integrated circuit is adapted to generate one or more signals and send the signals to transmit antennas/conductors. In an embodiment, the mixed signal integrated circuit is adapted to generate a plurality of frequency-orthogonal signals and send the plurality of frequency-orthogonal signals to the transmit antenna/conductors. In an embodiment, the mixed signal integrated circuit is adapted to generate a plurality of frequency-orthogonal signals and send one or more of the plurality of frequency-orthogonal signals to each of a plurality of rows. In an embodiment, the frequency-orthogonal signals are in the range from DC up to about 2.5 GHz. In an embodiment, the frequency-orthogonal signals are in the range from DC up to about 1.6 MHz. In an embodiment, the frequency-orthogonal signals are in the range from 50 KHz to 200 KHz. The frequency spacing between the frequency-orthogonal signals should be greater than or equal to the reciprocal of an integration period (i.e., the sampling period).

In an embodiment, the signal processor of a mixed signal integrated circuit (or a downstream component or software) is adapted to determine at least one value representing each frequency orthogonal signal transmitted to a row. In an embodiment, the signal processor of the mixed signal integrated circuit (or a downstream component or software) performs a Fourier transform to received signals. In an embodiment, the mixed signal integrated circuit is adapted to digitize received signals. In an embodiment, the mixed signal integrated circuit (or a downstream component or software) is adapted to digitize received signals and perform a discrete Fourier transform (DFT) on the digitized information. In an embodiment, the mixed signal integrated circuit (or a downstream component or software) is adapted to digitize received signals and perform a Fast Fourier transform (FFT) on the digitized information—an FFT being one type of discrete Fourier transform.

It will be apparent to a person of skill in the art in view of this disclosure that a DFT, in essence, treats the sequence of digital samples (e.g., window) taken during a sampling period (e.g., integration period) as though it repeats. As a consequence, signals that are not center frequencies (i.e., not integer multiples of the reciprocal of the integration period (which reciprocal defines the minimum frequency spacing)), may have relatively nominal, but unintended consequence of contributing small values into other DFT bins. Thus, it will also be apparent to a person of skill in the art in view of this disclosure that the term orthogonal as used herein is not "violated" by such small contributions. In other words, as used herein, the term frequency orthogonal herein, two signals are considered frequency orthogonal if substantially all of the contribution of one signal to the DFT bins is made to different DFT bins than substantially all of the contribution of the other signal.

In an embodiment, received signals are sampled at at least 1 MHz. In an embodiment, received signals are sampled at at least 2 MHz. In an embodiment, received signals are sampled at 4 Mhz. In an embodiment, received signals are sampled at 4.096 Mhz. In an embodiment, received signals are sampled at more than 4 MHz.

To achieve kHz sampling, for example, 4096 samples may be taken at 4.096 MHz. In such an embodiment, the integration period is 1 millisecond, which per the constraint that the frequency spacing should be greater than or equal to the reciprocal of the integration period provides a minimum frequency spacing of 1 KHz. (It will be apparent to one of skill in the art in view of this disclosure that taking 4096 samples at e.g., 4 MHz would yield an integration period slightly longer than a millisecond, and not not achieving kHz sampling, and a minimum frequency spacing of 976.5625 Hz.) In an embodiment, the frequency spacing is equal to the reciprocal of the integration period. In such an embodiment, the maximum frequency of a frequency-orthogonal signal range should be less than 2 MHz. In such an embodiment, the practical maximum frequency of a frequency-orthogonal signal range should be less than about 40% of the sampling rate, or about 1.6 MHz. In an embodiment, a DFT (which could be an FFT) is used to transform the digitized received signals into bins of information, each reflecting the frequency of a frequency-orthogonal signal transmitted which may have been transmitted by the transmit antenna 130. In an embodiment 2048 bins correspond to frequencies from 1 KHz to about 2 MHz. It will be apparent to a person of skill in the art in view of this disclosure that these examples are simply that, exemplary. Depending on the needs of a system, and subject to the constraints described above, the sample rate may be increased or decrease, the integration period may be adjusted, the frequency range may be adjusted, etc.

In an embodiment, a DFT (which could be an FFT) output comprises a bin for each frequency-orthogonal signal that is transmitted. In an embodiment, each DFT (which could be an FFT) bin comprises an in-phase (I) and quadrature (Q) component. In an embodiment, the sum of the squares of the I and Q components is used as measure corresponding to signal strength for that bin. In an embodiment, the square root of the sum of the squares of the I and Q components is used as measure corresponding to signal strength for that bin. It will be apparent to a person of skill in the art in view of this disclosure that a measure corresponding to the signal strength for a bin could be used as a measure related to an event. In other words, the measure corresponding to signal strength in a given bin would change as a result of an event.

The sensor and methodology described with respect to FIG. 1 provides an example of a sensor that can be employed in the system discussed below. The system described below focuses on improving sensing in environments that may not be stable or static. In some environments events may occur that generate movements, such as vibrations, that may impact events that are subjected to being sensed by a sensor. Instead of interfering with the ability to detect events, the movements may be used to enhance the detection of events. For example, the ability to use the movements, such as vibrations, that occur within a vehicle or similar environment subject to movement can be used to enhance sensing within that type of environment. In an embodiment, the movements are used to magnify a touch event or otherwise facilitate detection of a touch event. In an embodiment, the pressure from touch events can be taken continuously in the presence of movements, such as vibration. In an embodiment, touch events may be determined during different integration periods in the presence of movement. In an embodiment, touch events may be determined periodically in the presence of movement. In an embodiment, touch events may be determined continuously in the presence of movement. By obtaining continuous measurements, more data can be obtained for various kinds of averaging methodologies. Data can also be obtained by not obtaining continuous measurements but by obtaining over sufficiently long of enough time.

The ability to measure the mass of the occupant of a seat in a vehicle can have important applications in the automotive field, as well as applications in other fields wherein measurements of the user of a seat can provide useful information. This information is also applicable in the medical, gaming and other fields. This can be done by measuring the deflection of a mass-spring model, but there are advantages to doing it by measuring dynamic deflections of the mass-spring model. The two models can be combined to provide the advantages of both. The combination of both advantages can be used to enhance and improve the measurements taken by the system.

Figure 2:
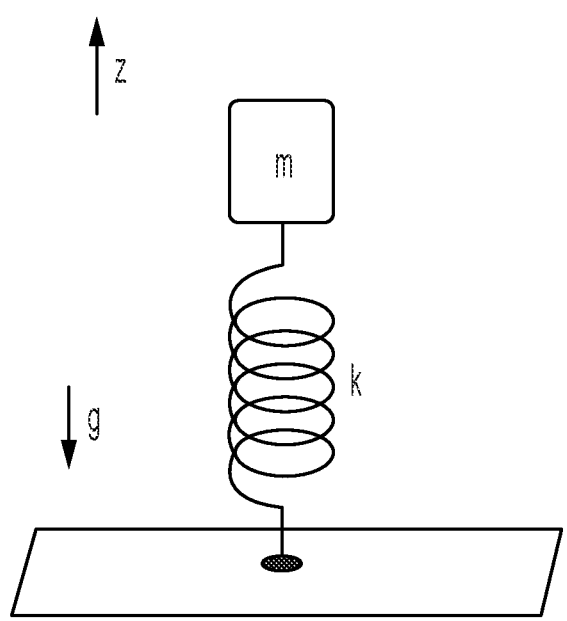
FIG. 2 is a diagram of a mass-spring model.

An occupied seat can be modeled as a mass-spring system as shown in FIG. 2. A first-order mass-spring system is composed of a linear spring with one end attached to a fixed point and the other attached to a mass acting under some force, such as gravity. According to Hooke's Law, the spring constant k provides the relationship between the force on the spring and how much it is compressed (or extended).

$$F=kz$$

In this model, the force on the spring is proportional to the mass and the local gravitational acceleration.

$$F=-mg$$

This gives the relationships:

$$kz = -mg \text{ and } m = -\frac{kz}{g}$$

This allows determination of the mass attached to the spring given only the spring's deflection and knowledge of gravity and the spring constant. A sensor, such as the sensor 100 discussed above, embedded in a seat, provides the deflection used in the calculation. That is to say the relative movement of the spring can be determined based on measurements taken with the sensor 100. The acceleration of gravity is relatively constant around the world and so is a known quantity to be used in the calculation. Knowledge of the spring constant can be a predetermined quantity, known at design time or experimentally determined at some time prior to the calculation. The determination of the mass using the above methodology works well when the seat is stationary, and can work if the seat is moving slightly by taking an average of the measurements.

In situations where a seat moves, measuring the mass present in the seat in a dynamic manner can also provide additional data for accurately determining information. In scenarios where the seat moves the static force of gravity on the mass may be ignored and only the motion of the mass around a static point may be measured. The mass-spring model discussed above undergoes simple harmonic motion with a frequency of:

$$f = \frac{1}{2\pi}\sqrt{\frac{k}{m}}$$

For example, if the seat undergoes a movement, such as vibration, for example, caused by a car going over a bump, the occupant will oscillate up and down at a frequency representative of the movement. The frequency of the movement is measured over a number of cycles and use it to compute the mass of the occupant with the following equation:

$$m = \frac{k}{(2\pi f)^2}$$

Note that the equation used above is not a function of g, and is a separate methodology used to measure the mass of the occupant of the seat.

There are further refinements. The mass-spring model of a seat probably follows a mass-spring-damper model, including some loss mechanism (similar to a shock absorber) that prevents the occupant from bouncing up and down for too long a time after the initial impulse. This can be modeled as a loss term in the differential equation that describes the motion of a mass, and will manifest as an attenuation, over time, of the amplitude of oscillation. The amount of attenuation will cause different regimes of behavior. These can be calculated and analyzed with differential equations and the equations below illustrate how our estimate of the occupant's mass will be affected by each regime.

The equations for force are started with the equations provided below, where $F_{mass}$ is the total force on the mass:

$$F_{mass} = ma = m\ddot{z}$$

and $$F_{spring} = -kz$$

A force term that is proportional to velocity is also used, this force term represents loss:

$$F_{friction} = -2p\dot{z}$$

Combining these into a single equation as follows $F_{mass} = F_{spring} + F_{friction}$, the following equation is obtained:

$$F_{mass} = m\ddot{z} = -2p\dot{z} - kz$$

$$m\ddot{z} + 2p\dot{z} + kz = 0$$

With the total force set to zero, assuming no outside driving force, this is a straightforward differential equation to solve by considering solutions of the form:

$$z = Ce^{\alpha t}$$

and yielding $$\dot{z} = \alpha Ce^{\alpha t}$$

$$\ddot{z} = \alpha^2 Ce^{\alpha t}$$

These equations can be substituted into the differential equation to turn $m\ddot{z} + 2p\dot{z} + kz = 0$ Into $m\alpha^2 Ce^{\alpha t} + 2p\alpha Ce^{\alpha t} + kCe^{\alpha t} = 0$.

Dividing through by the common $Ce^{\alpha t}$ term yields $$m\alpha^2 + 2p\alpha + k = 0$$

$\alpha$ is solved for using the quadratic formula.

$$\alpha = \frac{-2p \pm \sqrt{4p^2 - 4mk}}{2m} = \frac{-p \pm \sqrt{p^2 - mk}}{m}$$

The different behavioral regimes of the system corresponds to different values of the parameters.

The undamped regime corresponds to a system with no loss, i.e. where p is zero. The parameter $\alpha$ is imaginary and the solution to the differential equation is therefore:

$$\alpha = \pm j\sqrt{\frac{k}{m}}$$

$$z = Ce^{\pm j\sqrt{\frac{k}{m}}t} = C_1\cos(\omega t) + C_2\sin(\omega t) = A\cos(\omega t + \varphi)$$

Where $\omega = 2\pi f = \sqrt{\frac{k}{m}}$ and $\varphi$ is a phase factor. The variables A and $\varphi$ are determined by the initial conditions. The undamped case results in oscillations that never die down after the system experiences an impulse, such as driving over a sharp bump). The undamped case is physically unrealistic because there is typically always some loss in the system.

In the underdamped regime, where some loss exists (i.e. p>0) but $p^2 < mk$. The parameter $\alpha$ is complex:

$$\alpha = \frac{-p \pm \sqrt{p^2 - mk}}{m}$$

$$z = Ce^{\frac{-p \pm \sqrt{p^2 - mk}}{m}t}$$

$$z = Ce^{-\frac{p}{m}t} e^{\pm\sqrt{\left(\frac{p}{m}\right)^2 - \left(\frac{k}{m}\right)}t}$$

$$z = Ae^{-\frac{p}{m}t}\cos(\omega t + \varphi)$$

Where $\omega = 2\pi f = \sqrt{\left(\frac{p}{m}\right)^2 - \left(\frac{k}{m}\right)}$ and $\varphi$ is a phase factor. The variables A and $\varphi$ are again determined by the initial conditions. The underdamped case results in oscillations that die down exponentially after the system experiences an impulse. This behavior is commonly seen in real-world oscillating systems.

In the critically-damped case, where $p^2 = mk$ the parameter $\alpha$ is real.

$$\alpha = -\frac{p}{m}$$

There are two solutions to the differential equation, because of the repeated root (due to the ±0).

$$z = C_1 e^{-\frac{p}{m}t} + C_2 te^{-\frac{p}{m}t}$$

Where $C_1$ and $C_2$ are constants determined by initial conditions.

The critically-damped case results in no oscillation and is interesting from an engineering perspective because it returns the mass to its static resting position in the minimal time. Car seats may be designed to be near the critically-damped point, but are unlikely to be exactly there because the mass of the passenger will vary and cannot be known at design time.

In the overdamped case, where $p^2 > mk$, making the parameter $\alpha$ real, the equations are:

$$z = C_1 e^{\left(-\frac{p}{m} + \sqrt{\left(\frac{p}{m}\right)^2 - \left(\frac{k}{m}\right)}\right)t} + C_2 e^{\left(-\frac{p}{m} - \sqrt{\left(\frac{p}{m}\right)^2 - \left(\frac{k}{m}\right)}\right)t}$$

In the overdamped case, the mass returns to the static position without oscillating, but takes more time than the critically-damped case.

For purposes of occupant comfort, it is important that the seat yield after undergoing an impulse, but that it not bounce up and down much afterward. This means that the spring and damper system of the seat is preferably designed to operate near the critically-damped point for an occupant with a mass that's assumed at design time. Occupants heavier than the assumed mass will be in the underdamped regime and bounce longer than intended. Occupants lighter than the assumed mass will experience more damping than those heavier than the assumed mass.

In the above analysis, it is taken that the mass-spring-damper system was set into motion by a quick impulse and that its motion continues in an undriven state, i.e. no outside driving force is assumed. In many real world situations, the mass-spring damper system will experience a continuous external driving force, so the original equation can be set to:

$$m\ddot{z} + 2p\dot{z} + kz = F_{external}$$

The $F_{external}$ term represents the force pushing on the bottom of the car seat that drives the motion of the passenger mass. While it would be possible to measure the force directly, it would be easier to measure acceleration, this can be done with a MEMS (Micro-ElectroMechanical Systems) acceleration sensor. MEMS acceleration sensors are tiny, low-power and inexpensive. The equation provided above can be divided by m to achieve:

$$\ddot{z} + \frac{2p}{m}\dot{z} + \frac{k}{m}z = A_{external}$$

Where $A_{external}$ is the acceleration experienced by the base of the seat, below the mass-spring-damper system. The quantity $A_{external}$ is measured by an accelerometer. The quantities $z$, $\dot{z}$ and $\ddot{z}$ can be measured, inferred or estimated via a sensing system placed in the seat, under the mass. In an embodiment, this sensing system could be a capacitive sensor, and sensors with more capability can be used for more complex applications and/or for the determination of different parameters. The quantities p and k are known at design or calibration time. This means that the only unknown quantity is m, so this can be computed from known and measured quantities. The exact method of computing m will depend heavily on the specifics of $A_{external}$. The computation will likely use numerical and empirical methods because a closed-form solution may not be possible for arbitrary accelerations.

It should also be noted that the motion of a mass-spring-damper "pendulum" (whether hanging or 'inverted', as in this case) that is unconstrained in two or three dimensions may be chaotic, so z and its derivatives may not be directly computable—or even knowable—given only the external acceleration and other parameters. This is not a problem because z and its derivatives are measured (or at least estimated) and used to compute m. Many z values may be used to compute m, so the particular set (and trajectory) may not prove to be needed for the ultimate calculation.

Figure 3:
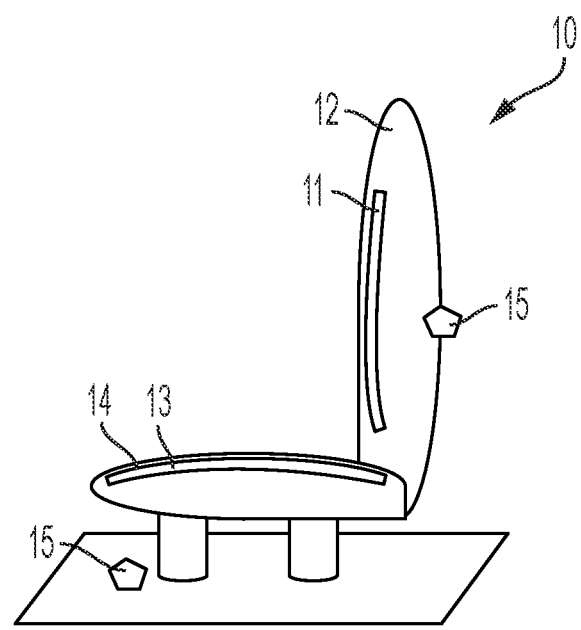
FIG. 3 is a schematic overview of a seat incorporating sensors.

FIG. 3 illustrates an embodiment of the application of the present application. Shown is a seat 10. Seat 10 may be located within a vehicle, such as a car. In an embodiment, the seat 10 is part of another vehicle such as a motorcycle. In an embodiment, the seat 10 is placed in a truck. In an embodiment, the seat 10 is part of an amusement ride. In an embodiment, the sensor 10 is used in an aircraft. In an embodiment, the seat 10 is placed in an environment that is in motion. In an environment, the seat 10 is located in an environment that is vibrating.

In an embodiment shown in FIG. 3, the seat 10 has a seat back 12 and a seat bottom 14 that may be fixed to the body of the vehicle, or otherwise secured to a vehicle. The seat 10 has a seat back 12 that has a sensor 11. In an embodiment, the sensor 11 is a capacitive type sensor. In an embodiment, the sensor 11 is a FMT type sensor and functions in the same manner as the sensor 100 discussed above. In an embodiment, the sensor 11 is an optical type sensor. In an embodiment, the sensor 11 is a MEMS type sensor.

As shown in FIG. 3, the seat 10 has a seat bottom 14 that has a sensor 13. In an embodiment, the sensor 11 and sensor 13 are the same type of sensor. In an embodiment, the sensor 13 is can as and functions in the same manner as the sensor 100 discussed above. In an embodiment, the sensor 13 is a capacitive type sensor. In an embodiment, the sensor 13 is a FMT type sensor. In an embodiment, the sensor 13 is an optical type sensor. In an embodiment, the sensor 13 is a MEMS type sensor.

In addition to sensor 11 and sensor 13, accelerometers 15 may be placed on the seat 10. The accelerometers 15 are able to provide additional sensitivity with respect to motion of the seat 10 and in particular are able to determine acceleration that is occurring within the vehicle or within the environment. Sensor 11 and sensor 13 can operate in conjunction with the accelerometers 15 in order to provide additional data that can be used in order to provide information regarding the mass located within the seat 10. The sensors 11 and sensor 13 can detect slight movements as well as larger movements that impact the seat back 12 and the seat bottom 14 of the seat 10. Using the method set forth above, the additional movement information can be used in order to refine and improve information regarding the occupant or object located within the seat 10. The measurements taken by sensor 11 and sensor 13 can be enhanced and refined by the measurements taken during the movement, such as, for example, vibrations of the seat 10.

Applications of this technique result in the measuring of the mass of the seat occupant by using both static measurements and measurements taken during movement that impacts the motion of the seat, such as, for example, vibrations. These measurements can also be used to determine the mass distribution of the occupant by using the measurements taken from the seat back 12 and the seat bottom 14. The sensors placed within the portions of the seat are used to determine which parts of the seat bottom 14 and seat back 12 are experiencing different pressures. For example, one passenger may have more of their mass concentrated in their upper chest, and another may have more concentrated lower in their torso. In an embodiment, there are multiple FMT sensors placed on the seat 10 in addition to the seat bottom 14 and the seat back 12, such as the arms or a headrest. In an embodiment, there are sensors placed in other locations of the vehicle or within the environment that are able to detect pressure or movement, such as the floor of the vehicle.

In an embodiment, the measurements made can be used for purposes other than or in addition to determining the mass of an occupant. In an embodiment, measurements made permit the vehicle or environment to distinguish from among a small set of possible occupants or people located within the environment. In an embodiment, measurements made permit the vehicle or environment to distinguish from among a small set of possible occupants or people located within the environment for security purposes. In an embodiment, measurements made permit the vehicle or environment to distinguish from among a small set of possible occupants or people for personalization purposes. In an embodiment, measurements made are used to control a smart airbag that can provide optimal protection for occupants of different masses and mass distributions. In an embodiment, the measurements are used to infer the orientation of an occupant's body to permit the optimal deployment of one or more airbags or other safety systems, based on that orientation. In an embodiment, the measurements are used to infer whether the occupant is wearing a safety belt, and how tight that safety belt is around the passenger, using knowledge of the passenger's mass, mass distribution, the passenger's orientation and current and past movements.

In an embodiment, measurements are used to determine what is occupying the seat or is located within the sensed environment. In an embodiment, measurements are used to determine the presence and number of adults. In an embodiment, measurements are used to determine if an adult carrying a child in their lap or if a child is in a child seat. In an embodiment, measurements are used to determine if there is a bag of groceries in the vehicle or within the environment. In an embodiment, measurements are used to determine the presence of an electronic item such as a laptop, phone, table, etc. located within the vehicle or environment. In an embodiment, measurements made are used to determine whether and/or when an airbag is triggered. In an embodiment, measurements made are used to optimize parameters within a vehicle or within an environment for a particular person or object.

In an embodiment, the measured mass is used to dynamically adjust the spring parameter, damping parameter, or both in order to improve the damping response provided by a vehicle within a seat in order to increase the occupant's comfort. In an embodiment, improvement of seat parameters are correlated with measured or predicted road conditions, vehicle settings (such as a suspension mode, i.e. cruise vs. sport vs. track), measured or predicted weather conditions, personal preferences, etc. to improve safety, comfort and/or performance.

In an embodiment, the vehicle's movements, such as turning, jogs, vibrations, bumps, acceleration and stops are measured. In an embodiment, the activities within an environment are measured to provide additional information with respect to the objects and individuals located within the environment.

In an embodiment, measurements are used to adjust vehicle suspension and other vehicle systems to allow for different distributions of mass within the vehicle. In an embodiment, measurements are used in order to optimize a vehicle's fuel economy. In an embodiment, measured or inferred mass distribution and occupant orientation permits the seat to morph, adjusting the firmness or "give" across various portions of the seat and seat back to optimize comfort. In an embodiment, comfort is optimized by attempting to equalize the pressure felt by the occupant across all surfaces of their body that touch the seat.

In an embodiment, the seat in question is mounted in a vehicle, such as an automobile, motorcycle, scooter, bicycle, aircraft, spacecraft or watercraft. In an embodiment, the seat is part of a wheelchair or other personal use device. In an embodiment, the seat does not have a regular chair-like form, but supports the occupant in a supine or partially reclined manner, such as a recliner, bed, stretcher, gurney or high-G seat. In an embodiment, the seat generates its own motion, such as a gaming chair or a seat in a simulator machine. In an embodiment, the motion might be generated by the occupant, instead of by the vehicle or other external system that is coupled to the seat. In an embodiment, the motion might be generated by both the occupant and the external system.

In an embodiment, the movement enhanced sensor is implemented into a wearable device wherein measurements taken during the movement of the body part and/or device are able to take the features of the movement in order to provide additional information regarding the movement of the wearable device. In an embodiment, measurements taken during the movement of a watch implementing the movement enhanced sensor can be used to provide additional information regarding positioning of the watch and other information gathered by the wearable. In an embodiment, vibrations caused during the wearing of a watch are used to further discriminate the positioning of the watch during the taking of blood flow measurements. In an embodiment, the wearable is placed on or proximate to the chest and uses movements of the chest in order to enhance the heart rate measurements taken. In an embodiment the movement enhanced wearable is placed on or proximate to the chest and uses movements of the chest in order to enhance the pulmonary measurements taken. In an embodiment, a movement enhanced sensor is embedded as part of a controller for games. The movement enhanced sensor is able to take measurements and used the measurements to further discrimination movements and gestures of hands for controlling a program.

An embodiment of the disclosure is a vehicle seat comprising a first sensor located within a portion of the vehicle seat, wherein the first sensor is adapted to take a plurality of measurements, wherein the plurality of measurements are used to determine information regarding an occupant or object contacting the portion of the seat where the first sensor is located; and wherein the first sensor is operably connected to a processor, wherein the processor is adapted to process the plurality of measurements taken by the first sensor and provide information regarding the occupant or object contacting the portion of the seat where the first sensor is located; and wherein the plurality of measurements comprises measurements taken during movement of the vehicle seat, wherein the measurements taken during movement of the vehicle seat are used to complement other measurements of the plurality of measurements and to improve the information regarding the occupant or object contacting the portion of the seat where the first sensor is located.

Another embodiment of the disclosure is a system comprising a first sensor operably connected to a portion of an item subjected to movement, wherein the first sensor is adapted to take a plurality of measurements, wherein the plurality of measurements are used to determine information regarding an occupant or object contacting the portion of the item subjected to movement where the first sensor is located;

and wherein the first sensor is operably connected to a processor, wherein the processor is adapted to process the plurality of measurements taken by the first sensor and provide information regarding the portion of the item subjected to movement where the first sensor is located; and wherein the plurality of measurements comprises measurements taken during movement of the item, wherein the measurements taken during movement of the item are used to complement other measurements of the plurality of measurements and to improve the information regarding the occupant or object contacting the portion of the where the first sensor is located.

The several embodiments discussed above illustrate a variety of systems for detecting events, but are not intended to limit the scope of the claims. Other systems' usage of event data will become apparent to persons of skill in the art in view of this disclosure, and are thus included within the scope of this disclosure.

While the invention has been particularly shown and described with reference to a preferred embodiment thereof, it will be understood by those skilled in the art that various changes in form and details may be made therein without departing from the spirit and scope of the invention.

The invention claimed is:

1. A vehicle seat comprising:
a first sensor located within a portion of the vehicle seat, wherein the first sensor is adapted to take a plurality of measurements, wherein the plurality of measurements are used to determine information regarding an occupant or object contacting the portion of the seat where the first sensor is located; and
wherein the first sensor is operably connected to a processor, wherein the processor is adapted to process the plurality of measurements taken by the first sensor and provide information regarding the occupant or object contacting the portion of the seat where the first sensor is located; and
wherein the plurality of measurements comprises measurements taken during movement of the vehicle seat, wherein the measurements taken during movement of the vehicle seat are used to complement other measurements of the plurality of measurements and to improve the information regarding the occupant or object contacting the portion of the seat where the first sensor is located.

2. The vehicle seat of claim 1, wherein the movement is vibrational movement.

3. The vehicle seat of claim 1, wherein the measurements taken during movement of the vehicle seat are processed by analyzed oscillations determined from the plurality of measurements taken during movement of the vehicle seat.

4. The vehicle seat of claim 1, wherein the other measurements are taken when the item is not in motion.

5. The vehicle seat of claim 1, wherein the portion of the vehicle seat is a seat bottom, wherein vehicle seat further comprises a second sensor located another portion of the vehicle seat, wherein the another portion of the vehicle seat is a seat back.

6. The vehicle seat of claim 1, further comprising an accelerometer operatively connected to the vehicle seat.

7. The vehicle seat of claim 1, wherein the first sensor is a capacitive sensor.

8. The vehicle seat of claim 7, wherein the first sensor comprises a plurality of first conductors operably connected to a signal generator and a plurality of second conductors operably connected to a receiver, wherein each of the plurality of first conductors has a frequency orthogonal signals transmitted thereon.

9. The vehicle seat of claim 1, wherein the information regarding the occupant or object contacting the portion of the seat where the first sensor is located is used to damped movement of the vehicle seat.

10. The vehicle seat of claim 1, wherein the information regarding the occupant or object contacting the portion of the seat where the first sensor is located is information regarding a mass of the occupant or object.

11. A system comprising:
a first sensor operably connected to a portion of an item subjected to movement, wherein the first sensor is adapted to take a plurality of measurements, wherein the plurality of measurements are used to determine information regarding an occupant or object contacting the portion of the item subjected to movement where the first sensor is located; and
wherein the first sensor is operably connected to a processor, wherein the processor is adapted to process the plurality of measurements taken by the first sensor and provide information regarding the portion of the item subjected to movement where the first sensor is located; and
wherein the plurality of measurements comprises measurements taken during movement of the item, wherein the measurements taken during movement of the item are used to complement other measurements of the plurality of measurements and to improve the information regarding the occupant or object contacting the portion of the where the first sensor is located.

12. The system of claim 11, wherein the movement is vibrational movement.

13. The system of claim 11, wherein the measurements taken during movement of the item are processed by analyzed oscillations determined from the plurality of measurements taken during movement of the item.

14. The system of claim 11, wherein the other measurements are taken when the item is not in motion.

15. The system of claim 11, wherein the item further comprises a second sensor located another portion of the item.

16. The system of claim 11, further comprising an accelerometer operatively connected to the item.

17. The system of claim 11, wherein the first sensor is a capacitive sensor.

18. The system of claim 17, wherein the first sensor comprises a plurality of first conductors operably connected to a signal generator and a plurality of second conductors operably connected to a receiver, wherein each of the plurality of first conductors has a frequency orthogonal signals transmitted thereon.

19. The system of claim 11, wherein the information regarding the occupant or object contacting the portion of a seat where the first sensor is located is used to dampen movement of the item.

20. The system of claim 11, wherein the information regarding the occupant or object contacting the portion of a seat where the first sensor is located is information regarding a mass of the item.

* * * * *